Figure 1:
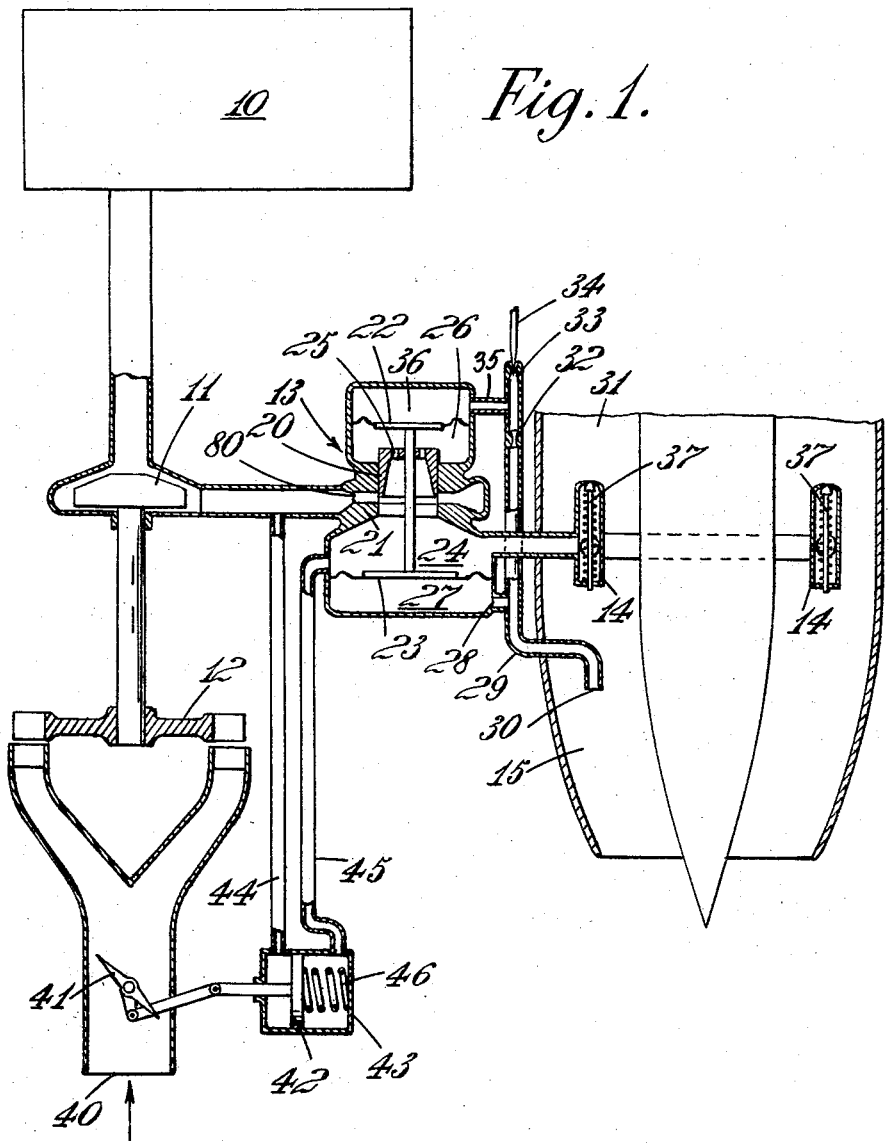

United States Patent Office 2,882,680
Patented Apr. 21, 1959

2,882,680
FUEL SUPPLY SYSTEMS FOR RAM JET ENGINES

Robin Ralph Jamison and Frank Dryburgh Henderson, Bristol, England, assignors, by mesne assignments, to Bristol Aero-Engines Limited, Bristol, England, a British company Application May 26, 1954, Serial No. 432,372

Claims priority, application Great Britain May 29, 1953

4 Claims. (Cl. 60—39.28)

This invention relates to fuel supply systems for ram-jet engines intended for the propulsion of crewless aircraft, this term including missiles.

For this purpose a self-controlled or "automatic" fuel system is required which will supply liquid fuel to the combustion zone of a ram-jet engine at a rate so co-ordinated with the rate of flow of the combustion air through the engine (produced by the ram effect of the forward movement of an aircraft which the engine is propelling and varying with the Mach number and altitude) as to maintain an efficiently combustible mixture in the combustion zone. In practice, therefore, the fuel/air ratio has to be maintained approximately constant at a suitable value.

According to the present invention, a fuel supply system for a ram-jet engine comprises a fuel pump in driven connection with a fluid pressure motor, said pump being arranged to supply liquid fuel to the combustion zone of the engine through flow-control means including at least one variable area orifice for controlling the flow of fuel in approximately direct proportion to the pressure of fuel passing to said flow-control means, and pressure control means for controlling the pressure of fuel passing to said flow-control means in substantially direct proportion to a control pressure which, during operation of the engine, is a measure of the mass flow of combustion air through the engine.

The control pressure may be the total pressure of the free airstream passing outside the engine during operation of the engine, or the total pressure of the airstream passing through the engine at a point upstream of said combustion zone during operation of the engine.

According to a feature of the invention, the pressure-control means may comprise throttling means arranged between the flow control means and the fuel outlet of the pump to adjust the pressure of fuel going to the flow control means from the pump. Alternatively, or in addition, however, said pressure control means may be arranged to adjust the pressure of fuel going to said flow control means by adjusting the flow of working fluid going to said fluid pressure motor.

When this alternative feature is adopted, it is preferred that the pressure control means comprises a servo-device which, during operation of the engine is powered by fluid pressure from the same source as the fluid pressure driving said fluid pressure motor.

According to another feature of the present invention, the fuel supply system may further comprise adjusting means for varying the ratio to be maintained between the pressure of fuel going to said flow control means and said control pressure during operation of the engine and said adjusting means may be automatically responsive to change of Mach number from a particular Mach number to vary said ratio in a sense such that when said engine is installed in an aircraft and is propelling the aircraft, the aircraft is stabilized in powered flight at the particular Mach number.

Figure 2:
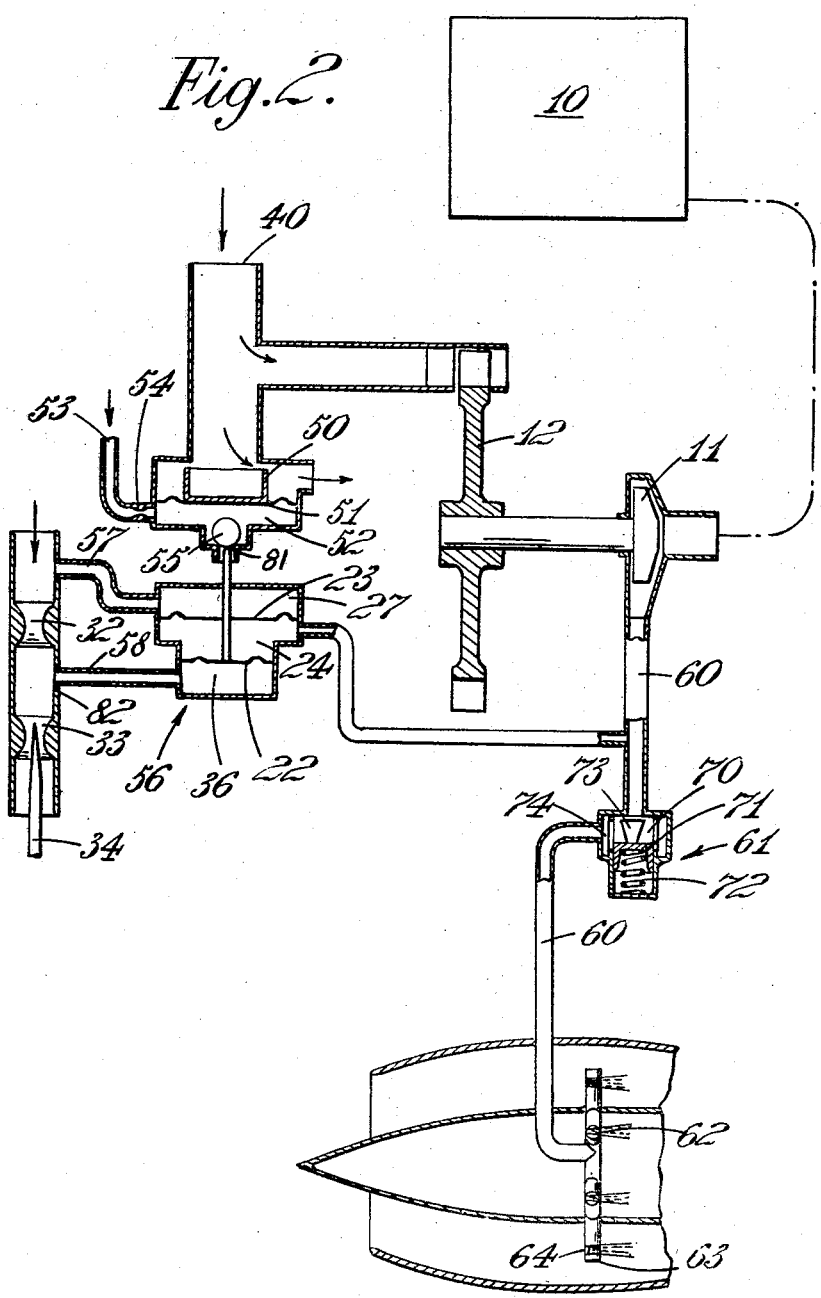
Figure 3:
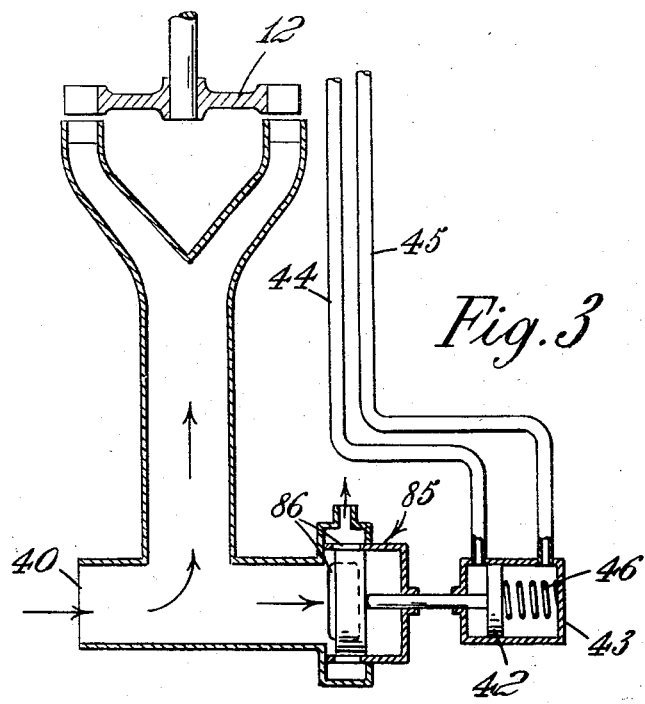
Figure 4:
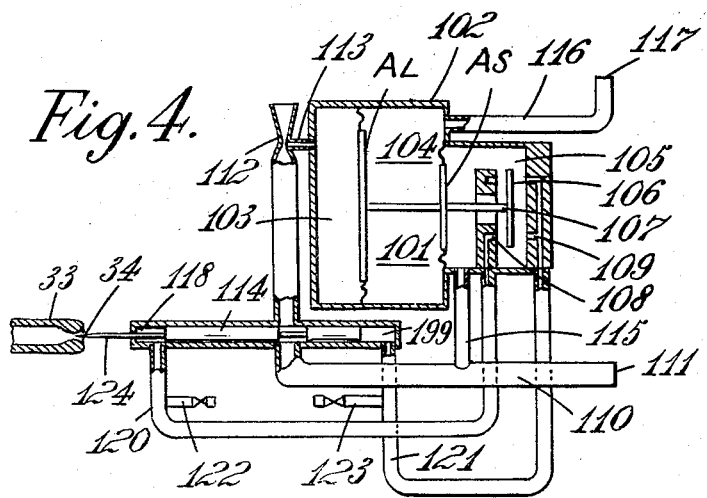

Two fuel systems in accordance with the present invention will now be described by way of example, with reference to the accompanying drawings in which:

Figure 1 shows diagrammatically one fuel supply system in accordance with the present invention, Figure 2 shows diagrammatically another fuel supply system in accordance with the present invention, Figure 3 shows diagrammatically a modification which may be applied to the fuel system of Figure 1 as will hereinafter be made clear, and Figure 4 shows diagrammatically a device constituting an adjusting means for a fuel supply system as shown in Figure 1 or Figure 2 whereby an aircraft propelled by an engine having a fuel supply system as illustrated in these figures may be maintained in powered flight at a predetermined Mach number.

Referring firstly to Figure 1, liquid fuel from a tank 10 is delivered by a centrifugal pump 11, driven by a fluid pressure motor in the form of an air turbine wheel 12, through pressure control means indicated generally at 13, to flow control means comprising spray injectors 14 of a ram-jet engine indicated at 15. The pressure-control means 13 comprises a balanced valve member 20 co-operating with a port 80 and operated by a pressure control device consisting of two diaphragms 22 and 23 of different areas. The fluel at reduced pressure enters the chamber 24 bounded by the diaphragm 23, and the same pressure is transmitted through holes 25 in the valve member 20 to the chamber 26, where it acts upon one side of the diaphragm 22. A chamber 27 on the other side of the diaphragm 23 is connected by a passage 28 to an air flow duct 29 having a ram air inlet 30 directed upstream in the airflow through the ram-jet engine 15 at a point upstream of the combustion zone 31. Downstream of the passage 28 the duct 29 is provided with two restrictions 32 and 33, the latter being fitted with a needle 34 whereby its throat area may be adjusted. From between these two restrictions a passage 35 leads to a chamber 36 on the side of the diaphragm 22 remote from the valve 20. The arrangement is designed to operate with a super-critical pressure drop across the second restriction 33, in which case it can be shown that the pressure between the restrictions and acting in the chamber 36 is a constant proportion of the pressure upstream of the first restriction and acting in the chamber 27, the ratio of the pressures being dependent only on the ratio of the throat areas of the restrictions 32, 33.

The valve 20, 80 operates in the following manner to maintain the pressure of fuel in the chamber 24 proportional to the total pressure of the airstream through the engine as measured by the inlet 30:

Let
$P_1$ be the said total pressure,
$KP_1$ the pressure between the restrictions 32 and 33,
$P_2$ the pressure of the fuel in the chambers 24 and 26,
$A_1$ and $A_2$ the areas of the diaphragms 22 and 23 respectively.

Then for equilibrium of the system:

$$KP_1A_1 + P_2A_2 = P_1A_2 + P_2A_1$$

Whence $$\frac{P_2}{P_1} = \frac{A_2 - KA_1}{A_2 - A_1}$$

Since $A_1$, $A_2$ and $K$ are all constant it follows that under equilibrium conditions the fuel pressure $P_2$ is directly proportional to the total pressure $P_1$. If $P_2$ should increase above the equilibrium value, the force on the larger diaphragm 23 will exceed that on the smaller diaphragm 22 thus moving the valve 20 towards the closed position to restore equilibrium.

Having obtained a fuel supply pressure proportional to the total pressure of the air flowing through the engine, it remains to control the flow of fuel going to the combustion zone, in proportion to the supply pressure. This is accomplished by the spray injectors 14 which are each of the kind comprising a variable area discharge orifice the area of which is controlled by a spring-loaded pintle valve 37.

The orifices and the valves 37 are designed so as to obtain the necessary degree of proportionality over a suitable working range of pressures of liquid fuel going to the injectors from chamber 24. Instead of the pintle type injectors the flow control means may comprise a proportional flow metering device as presently described with reference to Figure 2.

The centrifugal pump 11 is driven by the air turbine wheel 12 receiving air from a ram air inlet through a working fluid duct 40 and at all times produces a pressure in excess of the regulated pressure in the chamber 24. If, however, the pump pressure becomes excessive the sensitivity of the pressure-control means 13 will be reduced since small movements of the valve member 20 will produce large changes of pressure. It is preferred, therefore, to control the admission of air to the turbine 12 by means of a throttle valve 41 operated by a piston 42 working in a cylinder 43 the ends of which are connected by pipes 44 and 45 to the pump discharge and the controlled pressure chamber 24 respectively. The piston is thus urged in the throttle-closing direction by a force which is proportional to the difference in pressure of liquid fuel on the upstream and downstream sides of the port 80, and by providing a spring 46 or other suitable counterbalancing means the air turbine is controlled to maintain the said pressure drop approximately constant at a desired value.

In an alternative arrangement, referring to Figure 3, the throttle valve 41 may be replaced by a spill valve 85 in the working fluid duct leading ram air to the turbine 12, the opening of the ports 86 of the spill valve being controlled in the same manner as the opening of the throttle valve 41.

If it is desired to control an aircraft propelled by the ram-jet engine 15 to fly at a constant Mach number, this may be done by connecting the adjusting needle 34 to a device responsive to Mach number in such a way that departures from the selected Mach number influence the fuel/air ratio as controlled by the pressure-control means 13 in the sense to restore the speed to the selected Mach number. A device suitable for this purpose is illustrated in Figure 4 of the accompanying drawings:

Referring to Figure 4, the Mach number responsive device comprises a diaphragm $A_L$ connected by a rigid member 101 to a smaller diaphragm $A_S$, the diaphragms being enclosed in a casing 102 which is thereby divided into three chambers, 103, 104, 105. In chamber 105 is a valve comprising a valve member 106 connected to the diaphragms by a rod 107 and control ports 108, 109 one on each side of the valve member 106.

A high pressure passage 110 connects with a dynamic head port 111 arranged for location in the free air-stream, and the passage 110 supplies ram air to a venturi 112 designed to be choked during operation. The chamber 103 is connected to the throat of the venturi by a pipe 113, and the chamber 105 is connected to the passage 110 up-stream of the venturi and of a throttle valve 114 by a pipe 115. The intermediate chamber 104 is connected by a pipe 116 to a static head port 117 also arranged for location in the free airstream.

The throttle valve 114 is in the form of a piston valve movable to the right in Figure 4 (closing direction) by pressure fluid acting in a chamber 118, and to the left (opening direction) by pressure fluid acting in a chamber 119. The chamber 118 is connected by a passage 120 to the control port 108 and the chamber 119 is connected to the control port 109 by a passage 121. Bleeds 122, 123 allow fluid to leak from the passages 120, 121 respectively. The valve 114 has a rod 124 which carries the needle 34 movement of which adjusts the area of the restriction 33 previously described with reference to Figure 1, the movements of the throttle valve 114 being thereby directly transmitted to the needle 34.

If the pressures in the three chambers 103, 104 and 105 are $P_{11}$, $P_{12}$ and $P_{13}$ respectively it may be shown that the diaphragms $A_L$ and $A_S$ are in equilibrium when:

$$\frac{\frac{P_{11}}{P_{12}}-1}{\frac{P_{13}}{P_{12}}-1} = \frac{\text{area of diaphragm } A_S}{\text{area of diaphragm } A_L} = \text{constant}$$

and it will be noted from this equation that equilibrium depends only upon pressure ratio and not upon absolute pressures.

The device described operates to maintain a particular ratio between the pressures $P_{12}$ and $P_{13}$ at which the diaphragms $A_L$ and $A_S$ are in equilibrium, and the pressure $P_{11}$ which is an intermediate pressure is adjustable in value in relation to the pressure $P_{13}$ by the throttle valve 114 so that the ratio between $P_{11}$ and $P_{13}$ can be varied to maintain the equilibrium. Supposing the ratio of the pressures $P_{11}$, $P_{12}$ and $P_{13}$ be such that the diaphragms $A_L$, $A_S$ move upwardly, then the port 109 is obstructed by the valve member 106 and the bleed 123 is able to prevent the maintenance of pressure in the chamber 199 equal to that in chamber 118. The throttle valve 114 accordingly moves to the right in Figure 4 reducing the flow to the venturi 112 and lowering the pressure $P_{11}$ until equilibrium is restored and the valve member 106 moves away from the port 109. In a similar manner when the pressures $P_{11}$, $P_{12}$, $P_{13}$ are such that the diaphragms $A_L$, $A_S$ move to the left in Figure 4, valve member 106 obstructs port 108 and the throttle valve 114 moves to the left in Figure 4 to increase the flow to the venturi 112 and raise the pressure $P_{11}$ to restore the equilibrium.

Since the pressures $P_{12}$ and $P_{13}$ are derived from the static and dynamic head ports 117 and 111 respectively, the ratio between these pressures is maintained at a value corresponding to the particular flight Mach number for which the Mach number responsive device is designed. The extent of movement of the throttle valve 114 is a measure of the deviation from the particular flight Mach number, and this movement is transmitted to the needle 34 which, therefore, influences the fuel/air ratio in the ram jet engine as controlled by the pressure control means 13 in the sense to restore the speed to the particular Mach number as previously stated.

It is to be understood that the law relating displacements of the throttle valve 114 to pressure ratio $P_{12}$, $P_{13}$ is dependent upon the profile of the flow-controlling parts of the valve 114 and these are shaped to produce the desired result.

It is also to be understood that a stabilising device should preferably be employed in conjunction with the Mach number responsive device in order to reduce oscillation or hunting of the throttle valve 114.

The arrangement shown in Figure 2 differs from that of Figure 1 principally in that the fuel supply pressure is controlled wholly by regulating the speed of the air turbine 12 driving the fuel pump 11. For this purpose, a spill valve 50 in the working fluid duct 40 is operated by a servo-device powered by ram air and comprising a diaphragm 51 subjected to the pressure of air in a chamber 52, the air being admitted through a ram air inlet 53 containing a restrictor 54 and discharged through a port 81, the area of which is controlled by a valve member 55 so as to vary the closing force on the valve member 50 and the restrictor 54 has a throat area dimensioned such that the pressure of air in the chamber 52 can be effectively controlled by the valve member 55. The member 55 is operated through a rod 88 by a pressure control device 56 which is constructed in the same manner as the pressure control device described with reference to Figure 1. That is to say, it comprises diaphragms 22 and 23 of different area on the outside of which are chambers 27 and 36 receiving air respectively at the total pressure of the free airstream passing outside the engine during operation of the engine through a passage 57 and at a fraction of this pressure through a passage 58. The intermediate chamber 24, as before, is subjected to the controlled fuel pressure so that the system operates to maintain this pressure at a constant fraction of the free airstream pressure.

The passage 57 communicates with an air flow duct 82 having a ram air inlet positioned for location in the free airstream passing over the engine during operation of the engine, upstream of two restrictions 32, 33, and the passage 58 communicates with the duct 82 between the restrictions 32, 33. The restriction 33 has an adjusting needle 34 which may be operable by a device as described with reference to Figure 4 to maintain an aircraft propelled by the engine at a flight speed of predetermined Mach number. It will be appreciated that the spill valve 50 may be operated directly by the pressure control device through the rod 83 if desired, but this necessitates making the pressure control device considerably more powerful than is necessary if a servo-device is interposed as described. Conversely, the fuel pressure control valve 20 in Figure 1 may be operated through a servo device similar to that shown in Figure 2.

The pump 11 delivers fuel through a pipe 60 containing a metering device 61 to a manifold 62 the branches 63 of which are provided with discharge orifices 64 directed upstream and of such size that the flow characteristics of the system are substantially determined by the device 61. This latter comprises an inner chamber 70 receiving the fuel and containing a piston 71 held against the fuel pressure by a spring 72. The area of orifices 73 in the wall of the chamber is adjusted by movements of the piston 71, and the orifices permit fuel to flow out into an outer chamber 74 from which it is supplied by the pipe 60 to the manifold 62. It will be appreciated that by suitably shaping or arranging the orifices 73 the pressure-flow characteristic may be made substantially linear so as to maintain the fuel/air ratio constant.

With the fuel supply system as described with reference to Figure 2, the ram air supply to the turbine wheel 12 is controlled by the servo device comprising the diaphragm 51 which is also powered by ram-pressure air and this has the advantage that the servo power is immediately available when, as is usually the case, the engine is brought into operation by rapidly accelerating the aircraft by rocket motors, or other means acting only for a short period, to above the minimum speed at which the engine will operate. The servo device can be powered by fuel supplied under pressure by the pump, but in this case, there is of course, a greater delay before the system as a whole settles down to normal operation.

Although only a single ram jet engine has been shown in Figures 1 and 2, it is to be understood that two or more such engines may be supplied with fuel by a single pump 11 and its driving and control system. With the system as described with reference to Figure 1, it is also to be understood that a single air turbine 12 may drive separate fuel pumps 11 for a number of engines, each engine being provided with its own fuel supply system as described with reference to Figure 1.

We claim:
1. A fuel supply system for a ram jet engine for controlling the supply of fuel during all phases of operation of the engine, said fuel supply system comprising an air turbine, a forwardly facing air intake opening, a duct from said opening to said turbine, airflow control means associated with said duct, a centrifugal fuel pump coupled to said turbine, fuel storage means, first conduit means connecting said storage means with the inlet to said pump, second conduit means connecting the outlet of said pump to a liquid fuel burner of the engine, a valve in said second conduit means, said valve comprising two members and a spring, one member being urged in one direction relatively to the other predominantly by said spring and in the other direction relatively to the other by the pressure of fuel arriving at the valve, said members defining between them an orifice through which fuel flows to said burner which orifice increases in area with increase of said pressure so that the flow of fuel through the orifice is directly proportional to said pressure, third conduit means connecting the outlet of said pump to a chamber bounded on opposite sides by two diaphragms of different area, chambers on the opposite sides of each of said diaphragms, conduit means including a forwardly facing air intake opening and first and second restrictions in succession, means for varying the cross-sectional area of one of said restrictions, means conveying the pressure upstream of said first restriction to said chamber on the opposite side of the larger of the diaphragms, means conveying the pressure between said restrictions to said chamber on the opposite side of the smaller of the diaphragms, means constraining said diaphragms to move in unison, a servomotor responsive to the movements of said diaphragms and means for applying the power of said servomotor to said airflow control means in the sense to increase the flow of air to said turbine when said diaphragms move in the direction to increase the volume of the chamber on said opposite side of the larger of the diaphragms, and vice versa.

2. A fuel supply system as claimed in claim 1, wherein said airflow control means includes a spill valve for spilling air from said duct.

3. A fuel supply system as claimed in claim 1, wherein said servomotor includes a chamber with a movable wall portion constituting a power element, a forwardly facing air intake opening, a duct from said opening to said chamber, and valve means controlling the pressure of air in said chamber.

4. A fuel supply system as claimed in claim 1, wherein said means for varying the cross-sectional area of one of said restrictions includes a valve member and means for moving said member in response to change in Mach number of the ram jet engine when the latter is in movement, the movement of said valve member being in the sense to increase the pressure in the chamber on said opposite side of the smaller of the diaphragms when the Mach number increases, and vice versa.

References Cited in the file of this patent

UNITED STATES PATENTS

| | | |
|---|---|---|
| 2,540,594 | Price | Feb. 6, 1951 |
| 2,550,678 | Deacon | May 1, 1951 |
| 2,566,319 | Deacon | Sept. 4, 1951 |
| 2,610,464 | Knoll | Sept. 16, 1952 |
| 2,643,514 | Jubb | June 30, 1953 |
| 2,654,995 | Ostroff | Oct. 13, 1953 |
| 2,693,675 | Schaffer | Nov. 9, 1954 |
| 2,714,803 | Abild | Aug. 9, 1955 |
| 2,729,061 | Grafinger et al. | Jan. 3, 1956 |
| 2,739,442 | Neal et al. | Mar. 27, 1956 |
| 2,742,755 | Davies et al. | Apr. 24, 1956 |